United States Patent Office 3,442,906
Patented May 6, 1969

3,442,906
2-METHYLENE-4-THIOXO-1,3-OXATHIAN-6-ONES AND THEIR PREPARATION
James C. Martin and Paul G. Gott, Kingsport, Tenn., assignors to Eastman Kodak Company, Rochester, N.Y., a corporation of New Jersey
No Drawing. Filed Dec. 8, 1967, Ser. No. 688,960
Int. Cl. C07d 89/12
U.S. Cl. 260—327        8 Claims

ABSTRACT OF THE DISCLOSURE

Preparation of novel substituted 2-methylene-4-thioxo-1,3-oxathian-6-ones by reacting a dialkylketene with carbon disulfide, with or without a solvent, at controlled reaction temperatures ranging from —20 to 100° C. and thereafter separating the substituted 2-methylene-4-thioxo-1,3-oxathian-6-one from the reaction mixture by distillation in vacuo or other means. The dialkylketene reactant may contain the same or different alkyl groups containing from 1 to 12 carbon atoms. The novel compounds of the invention are useful as intermediates for the preparation of thioamides by reaction with various amines and these thioamides are useful as catalysts in the synthesis of acrolein resins. Such thioamides are also known to be useful as vulcanization accelerators in rubber processing, as fungicides, corrosion inhibitors and lubricating oil additives.

---

This invention relates to a process for the preparation of substituted 2-methylene-4-thioxo-1,3-oxathian-6-ones by reaction of dialkylketenes with carbon disulfide.

The only disclosure in the literature describing the reaction of a dialkylketene with carbon disulfide which has come to our attention is that by Staudinger et al., in Helv. Chim. Acta, 8 314 (1925) wherein they described the reaction of dimethylketene with carbon disulfide using trimethylamine as a catalyst and wherein they state that they obtained a polymeric material with the empirical formula $C_{25}H_{26}N_4O_9$. As will be apparent from the description which follows, this disclosure in no way anticipates the present invention wherein dialkylketenes and carbon disulfide are reacted in the present of a phosphorus-containing catalyst to give discrete monomeric compounds.

This invention has as an object to provide discrete monomeric compositions by reacting dialkylketenes with carbon disulfide.

A further object is to provide novel compositions of matter useful as intermedites for the preparation of thioamides which are known to be useful as vulcanization accelerators in rubber processing, as fungicides, corrosion inhibitors and lubricating oil additives, such novel compositions being substituted 2 - methylene - 4 - thioxo-1,3-oxathian-6-ones.

A still further object is to provide a novel process for the preparation of 2-methylene-4-thioxo-1,3-oxathian-6-ones.

Other objects will appear hereinafter.

These objects are accomplished by the following invention which, in its broader aspects, comprises reacting a dialkylketene with carbon disulfide in the presence of a phosphorus-containing compound as a catalyst, with or without a solvent, under controlled reaction conditions and thereafter separating the substituted 2-methylene-4-thioxo-1,3-oxathian-6-one product from the reaction mixture by distillation in vacuo or equivalent means.

The dialkylketene reactant may contain the same or different alkyl groups containing from 1 to 12 carbon atoms such as methyl, ethyl, propyl, isopropyl, butyl, isobutyl, pentyl, hexyl, octyl, dodecyl, pentamethylene, tetramethylene and the like. These dialkylketenes may be prepared, for example, by the process described in the U.S. Patent to Hasek and Elam 3,201,474.

The reaction temperature may be controlled within the range of —20 to 100° C. The particular temperature range employed will depend upon the particular dialkylketene reactant employed. In general, the lower the number of carbon atoms present in either or both of the alkyl groups of the dialkylketene, the lower will be the desirable reaction temperature.

Although it is generally preferred to employ a solvent medium in which the reaction proceeds, the reaction can be carried out without the use of solvents. Typical suitable solvents include the following classes of compounds: ethers such as diethyl ether, tetrahydrofuran, dioxane, and dibutyl ether; esters such as ethyl acetate, methyl benzoate, isopropyl acetate, and isobutyl isobutyrate; aliphatic and aromatic hydrocarbons such as benzene, toluene, xylene, hexane and heptane; chlorinated aliphatic and aromatic hydrocarbons such as chlorobenzene, chloroform and tetrachloroethane; nitriles such as acetonitrile, isobutyronitrile and benzonitrile; nitro compounds such as nitrobenzene, nitromethane and nitropropane.

In carrying out our novel process, for purposes of economy we prefer to employ the reactants in an equimolar ratio, but an excess of either reactant can be employed if desired.

Suitable catalysts for our process are selected from the general classes of phosphines, phosphites, phosphinites, and phosphonites.

Phosphines suitable for use as catalysts in the invention have the structural formula

$$(R')_3P$$

wherein R' is an alkyl group containing from 1 to 12 carbon atoms or an aryl group such as phenyl. Typical of such phosphines are: trimethyl-, triethyl-, tributyl-, trioctyl-, tridecyl-, triphenyl-, tribenzyl-, diethylbutyl-, diphenylmethyl-, tricyclohexyl-, butylethylphenyl-, dicyclohexylmethyl-phosphines, etc.

Phosphites suitable for use as catalysts in the invention have the structural formula

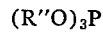
$$(R''O)_3P$$

wherein R" is an alkyl group containing from 1 to 12 carbon atoms or an aryl group such as phenyl. Typical of such phosphites are: trimethyl-, triethyl-, tributyl-, tridecyl-, tridodecyl-, triphenyl-, tricyclohexyl-, tribenzyl-, trioctyl-, diethylmethyl-, dimethylphenyl, methylethyloctylphosphites.

Phosphinites suitable for use as catalysts in the invention have the structural formula

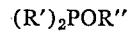
$$(R')_2POR''$$

wherein R' and R" aer alkyl groups containing from 1 to 12 carbon atoms or an aryl group such as phenyl. Typical of such phosphinites are butyldiphenylphosphinite, O-methyldiethylphosphinite, O-phenyldimethylphosphinite and O-methyldibutylphosphinite.

Phosphonites suitable for use as catalysts in the invention have the structural formula

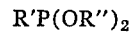
$$R'P(OR'')_2$$

wherein R' and R" are alkyl groups containing from 1 to 12 carbon atoms or an aryl group such as phenyl. Typical of such phosphonites are dibutylphenylphosphonite, O,O-dibutylphenylphosphonite, O,O-triphenylphosphonite, O,O-dimethylethylphosphonite and O,O-diethylphenylphosphonite.

The catalyst can be used in amounts ranging from 0.1 to 10% by weight, based on the weight of the dialkylketene reaction used. The catalyst should generally be mixed with carbon disulfide and the dialkylketene added, but other methods of practicing the invention will be apparent to those skilled in the art.

The following type reaction will indicate the reaction of dialkylketenes with carbon disulfide to produce the novel substituted 2-methylene-4-thioxo-1,3-oxathian-6-ones of our invention.

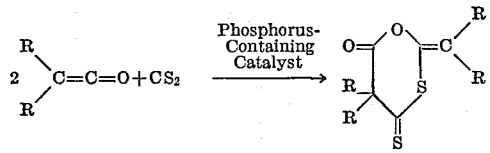

wherein R is an alkyl group containing from 1 to 12 carbon atoms.

Our invention will be further illustrated by the following examples of preferred embodiments, although it will be understood that these examples are included merely for purposes of illustration and are not intended to limit the scope of the invention.

Example 1

2-isopropylidene - 5,5 - dimethyl-4-thioxo-1,3-oxathian-6-ones may be prepared in accordance with the following equation.

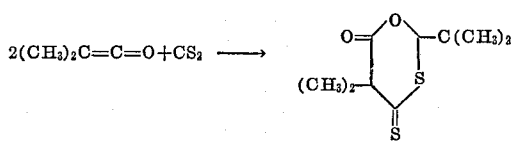

127 g. (1.82 moles) of dimethylketene is added rapidly to a solution of 2 g. of triphenylphosphine in 500 ml. of carbon disulfide. The exothermic reaction is controlled at 30–37° C. by use of an ice bath. After stirring for 2 hr. the excess carbon disulfide is removed in vacuo to give a quantitative yield of product as a waxy solid. Recrystallization from hexane gave 138 g. (70%) of 2-isopropylidene-5,5-dimethyl - 4 - thioxo-1,3-oxathian-6-one, M.P. 77–79° C.

*Analysis.*—Calcd. for $C_9H_{12}O_2S_2$: C, 50.0; H, 5.6; S, 29.6. Found: C, 50.2; H, 5.5; S, 29.1.

The N.M.R. and infrared spectra are in agreement with the proposed structure.

Example 2

2-(butylethylmethylene) - 5 - butyl-5-ethyl-3-thioxo-1,3-oxathian-6-one may be prepared in accordance with the following equation.

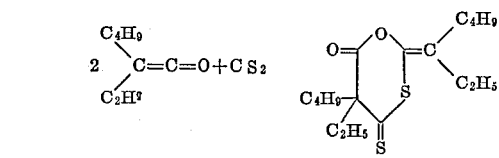

1.5 ml. of tributylphosphine is added to a stirred mixture of 250 g. of carbon disulfide and 48 g. (0.38 mole) of butylethylketene. A vigorous, exothermic reaction sets in and the solution turns dark red. After stirring the reaction solution for 1 hr., the solvent is removed in vacuo to give a quantitative yield of 2-(butylethylmethylene)-5-butyl-5-ethyl-4-thioxo-1,3-oxathian-6-one. The infrared and N.M.R. spectra are in agreement with the proposed structure.

Example 3

Under the general conditions of Example 1, 200 g. of carbon disulfide, 35 g. (0.5 mole) of dimethylketene and 2 ml. of triethyl phosphite gives after two recrystallizations from hexane, 29 g. (54%) of 2-isopropylidene-5,5-dimethyl-4-thioxo-1,3-oxathian-6-one.

Employing the following reaction conditions in essentially the procedure of Example 1, the indicated dialkylketenes may be reacted with carbon disulfide in the presence of a phosphorus-containing catalyst to produce the corresponding novel substituted 2-methylene-4-thioxo-1,3-oxathian-6-ones by reaction of dialkylketenes with carbon disulfide.

| Ex. No. | Ketene | Catalyst | Solvent | Temp., °C. | Product | Analysis, Percent S | |
|---|---|---|---|---|---|---|---|
| | | | | | | Calcd. | Found |
| 5 | $C_3H_7$, $CH_3$ $C=C=O$ | $(CH_3O)_3P$ | Carbon Disulfide. | 40 | (structure) | 23.5 | 23.8 |
| 6 | (thiopyranylidene)$C=O$ | $(C_4H_9O)_2PC_6H_5$ | Acetonitrile | 0 | (structure) | 21.6 | 21.5 |
| 7 | $(C_8H_{17})_2C=C=O$ | $(C_6H_5CH_2)_3P$ | Xylene | 100 | (structure) | 10.5 | 10.2 |
| 8 | $(C_{12}H_{25})_2C=C=O$ | $(C_4H_9)_3P$ | Nitrobenzene | 100 | (structure) | 7.7 | 7.7 |
| 9 | $(CH_3)_2CHCH_2$, $C_2H_5$ $C=C=O$ | $C_4H_9P(C_6H_5)_2$ | Carbon Disulfide. | 75 | (structure) | 19.5 | 19.3 |

Example 4

Thioisobutyryl piperidine is prepared in accordance with the following equation:

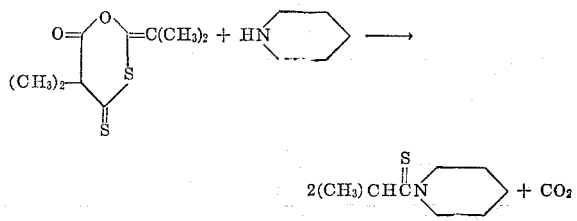

5.10 g. (0.06 mole) of piperidine is added portionwise to 6.48 g. (0.03 mole) of 2-isopropylidene-5,5-dimethyl-4-thioxo-1,3-oxathian-6-one. The reaction is exothermic and the mixture is cooled intermittently to keep the temperature below 60° C. A gas is evolved during the addition. The reaction solution is then warmed on a steam bath for 2 hr. and distilled through a 6-in. Vigreux column to give 5.8 g. (56%) of thioisobutyryl piperidine, B.P. 100–102° (0.8 mm).

Analysis.—Calcd. for $C_9H_{17}NS$: C, 63.1; H, 10.0; S, 18.7. Found: C, 62.9; H, 10.0; S, 18.8.

The N.M.R. spectrum is in agreement with the assigned structure.

The thioisobutyryl piperidine prepared above can be used as a catalyst for the preparation of modified acrolein resins as described in British Patent 849,041.

A mixture of 8 g. of freshly distilled acrolein and 2 g. of epichlorohydrin is treated with 0.3 g. of thioisobutyryl piperidine and set aside in a closed vial overnight. The mixture sets to a hard resin. A mixture of acrolein and epichlorohydrin prepared similarly and not treated withe catalyst does not polymerize.

Although the invention has been described in considerable detail with reference to certain preferred embodiments thereof. it will be understood tthat variation and modifications can be effected without departing from the spirit and scope of the invention as described hereinabove and as defined in the appended claims.

We claim:

1. The process of preparing substituted 2-methylene-4-thioxo-1,3-oxathian-6-ones having the structural formula:

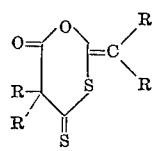

wherein R is an alkyl group containing from 1 to 12 carbon atoms, which comprises reacting a dialkylketene with carbon disulfide in the presence of a catalyst selected from the group of alkyl and aryl phosphines, phosphites, phosphinites, and phosphonites.

2. The process of claim 1 in which the reaction is carried out at a temperature within the range of $-20$ to $100°$ C.

3. The process of claim 1 in which the reaction is carried out at a temperature within the range of $-20$ to $100°$ C. and thereafter separating the substituted 2-methylene-4-thioxo-1,3-oxathian-6-one product from the reaction mixture by distillation.

4. The process of claim 3 in which the reaction is carried out in the presence of a solvent.

5. A substituted 2-methylene-4-thioxo-1,3-oxathian-6-one having the structural formula:

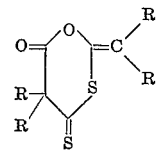

wherein R is an alkyl group containing from 1 to 12 carbon atoms.

6. 2-isopropylidene-5,5-dimethyl-4 - thioxo-1,3 - oxathian-6-one.

7. 2-(isobutylethylmethylene) - 5 - isobutyl-5-ethyl-4-thioxo-1,3-oxathian-6-one.

8. 2-(methylpropylmethylene) - 5 - methyl-5-propyl-4-thioxo-1,3-oxathian-6-one.

No references cited.

JAMES A. PATTEN, *Primary Examiner.*

U.S. Cl. X.R.

260—293.4, 88.3, 792; 424—999; 252—391, 47